United States Patent
Schmidt et al.

[11] 3,884,046
[45] May 20, 1975

[54] CRYSTALLIZATION OF A FATTY COMPONENT FROM A FEED BY THE STEPS OF EMULSIFICATION WITH A SURFACTANT, COOLING BY VACUUM EVAPORATION AND SUBSEQUENT CONVENTIONAL SEPARATION

[75] Inventors: Hans Joachim Schmidt; Albert Hartmann, both of Frankfurt am Main, Germany

[73] Assignee: Metallgesellschaft Aktiengesellschaft, Frankfurt am Main, Germany

[22] Filed: Mar. 26, 1970

[21] Appl. No.: 38,606

[30] Foreign Application Priority Data
Mar. 26, 1969 Germany............................ 1915298

[52] U.S. Cl. ..................... 62/58; 260/707; 260/419
[51] Int. Cl............................................. E01d 9/04
[58] Field of Search ........ 260/707, 428, 428.5, 419; 62/58; 23/301 R

[56] References Cited
UNITED STATES PATENTS

| | | | |
|---|---|---|---|
| 2,352,883 | 7/1944 | Bolley | 62/58 |
| 2,448,802 | 9/1948 | Holzcker | 62/58 |
| 2,934,547 | 4/1960 | Ruddick | 260/419 |
| 3,102,908 | 9/1963 | Raynes | 62/58 |
| 3,180,870 | 4/1965 | Spitzer | 260/707 |
| 3,235,578 | 2/1966 | Zilch | 260/428.5 |
| 3,253,007 | 5/1966 | Lunde | 260/428 |
| 3,284,396 | 11/1966 | Talalay | 62/58 |
| 3,285,026 | 11/1966 | Svanoe | 62/58 |
| 3,303,121 | 2/1967 | Li et al. | 62/58 |
| 3,541,122 | 11/1970 | Payne et al. | 260/428 |
| 3,643,453 | 2/1972 | Groothuis | 62/58 |

FOREIGN PATENTS OR APPLICATIONS
1,136,786  4/1963  Germany ............................... 62/58

*Primary Examiner*—A. Louis Monacell
*Assistant Examiner*—Frank Sever
*Attorney, Agent, or Firm*—Karl F. Ross; Herbert Dubno

[57] ABSTRACT

A method of separating components of fatty-acid, fatty-alcohols and fatty-acid-ester mixtures thereof in which an aqueous surfactant solution is intimately mixed with the fatty-acid, fatty-alcohol or fatty-acid-ester mixture to form an emulsion and, in one or more stages, reduced pressure(suction) is applied to evaporate water and reduce the temperature to the crystallization level. Preferably the evaporation of water is carried out in several stages, the aqueous surfactant being supplied all at once or in several stages. The crystallized component is then recovered by solid-liquid separation.

9 Claims, 1 Drawing Figure

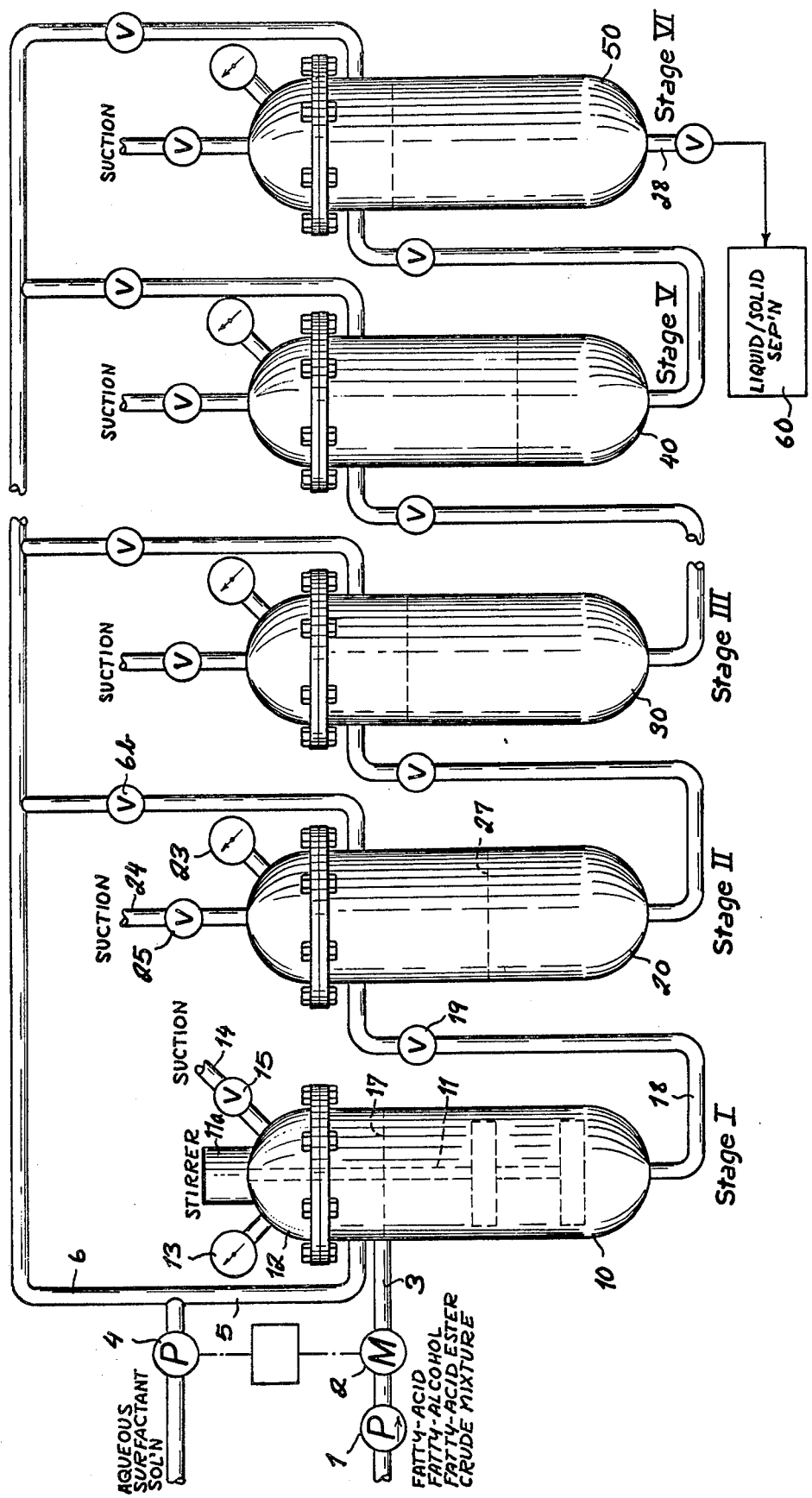

CRYSTALLIZATION OF A FATTY COMPONENT FROM A FEED BY THE STEPS OF EMULSIFICATION WITH A SURFACTANT, COOLING BY VACUUM EVAPORATION AND SUBSEQUENT CONVENTIONAL SEPARATION

1. FIELD OF THE INVENTION

Our present invention relates to the separation of fatty acids, fatty alcohols and fatty-acid esters from mixtures containing same and, more particularly, to an improved method of and system for the recovery of selected components from such mixtures in a simple economical and convenient manner.

2. BACKGROUND OF THE INVENTION

Fatty acids (i.e. long-chain hydrocarbons having one or more carboxyl groups and fully saturated or with various degrees of unsaturation), fatty alcohols (i.e. long-chain alkane or alkene alcohols) and fatty-acid esters (i.e. esters of the aforementioned fatty acids in which the esterifying alcohol is a mono- or polyhydric alcohol and may be a glycol, or glycerol are generally obtained in mixtures which, for technical and other purposes, may require separation into components or groups of components.

Prior-art suggestions as to separation of such mixtures have not proved effective on a commercial and industrial level because of the physical similarity of the components of the mixtures and the number of such components which may be present in any particular mixture. When reference is made herein to the separation of fatty acids, fatty alcohols and fatty-acid esters, it is to be understood that the mixtures may contain such components with carbon chains of 8 to 26 carbon atoms and at least one component which is solid at room temperature or temperatures slightly therebelow. Typical components of such mixtures are caprylic (hexanoic), heptanoic, octanoic, nonoic, decanoic, undecylic, lauric, tridecylic, myristic, pentadecylic, palmitic, heptadecanoic, octadecanoic (stearic), nondecylic, arachidic, oleic, and/or ricinoleic monocarboxylic acids, the corresponding alcohols and the corresponding triglycerides.

Prior-art systems for separating these components from mixtures such as animal and vegetable fats have concentrated upon fractional crystallization, solvent extraction and the like. It has, however, been proposed to provide an extraction technique in which liquid components are removed from the surfaces of solid components of the mixture by treatment with an aqueous solution of a surface-active agent. The nonsolid components are recovered from the liquid phase of the resulting emulsion while the solid phase may also be recovered free from the adherent liquid components, by separation of the mixture in a centrifuge or the like.

In all prior-art arrangements involving this treatment of a fatty acid, fatty alcohol or fatty-acid ester mixture with aqueous solutions of surface-active agents, it has been necessary heretofor to provide the cooling stage with a cooling device of the scraper, conveyor or metal-belt type in which the blades of the conveyer entrain the cooling liquid and solidifying mass across a coolant surface from the inlet to the outlet of the device. Scraper-type coolers of this character are, of course expensive and their use has been found to be associated with high production costs and considerable capital investment. This disadvantage is all the more significant in light of the fact that a cooling device must be used in conjunction with refrigerating units of considerable cost and complexity. Furthermore, the crystallization, precipitation or solidification which can be carried out in such plants, frequently gives rise to products of insufficient purity. Hence, the system does not yield products of satisfactory quality, is expensive to operate and requires considerable capital expenditure.

3. OBJECTS OF THE INVENTION

It is the principal object of the present invention to provide an improved method of separating fatty acids, fatty alcohols and fatty-acid esters whereby the aforementioned difficulties are obviated and the separation can be carried out to yield products of high quality at relatively low cost.

It is another object of our invention to provide an improved method of and apparatus for the recovery of individual components, or groups of components, from such mixtures with relatively low capital expenditure and operating cost, and relatively high separation efficiency.

Yet another object of the invention is to provide a separation method which can eliminate the need for expensive refrigerating and scraper-type cooling equipment.

4. SUMMARY OF THE INVENTION

These objects are obtained, in accordance with the present invention, as a result of our surprising discovery that it is possible to eliminate totally the scraper cooling of the product of the treatment of a fatty acid, fatty alcohol or fatty-acid ester mixture and yet obtain a separation of the components and a preparation or crystallization which is more effective than any which employs such coolers. The invention resides in the use, in the combination set forth below, solely of evaporative cooling to bring the treatment mixture to a temperature at which crystallization can commence.

According to the principles of the present invention, fatty-acid, fatty-alcohol and/or fatty-acid-ester mixtures can be separated into components or fractions of different melting points by admixing with the molten organic phase, an aqueous surface-active solution (aqueous phase), capable of solubilizing part of the organic mixture; cooling the resulting emulsion or mixture of the organic and aqueous phases to effect a precipitation from the liquid phase and form a dispersion in which part of the organic component appears in a solid form whereas part remains in a liquid state, by evaporation under reduced pressure of part of the aqueous phase; and thereafter recovering the solid components from the heterogeneous mixture. The crystallization of the solid components to be separated from the aqueous phase is produced by the simultaneous cooling and reduction in volume of the liquid phase of the treatment mixture brought about by evaporation of a portion of the water under reduced (i.e. subatmospheric) pressure.

According to an important feature of this invention, the mixture of fatty acids, fatty alcohols or fatty-acid glycerides is combined with the aqueous phase so as to form an emulsion therein of the oil-in-water type, i.e. at least over the total process, the aqueous phase is in excess, the mixing necessary for the emulsification being provided by mechanical agitation or the agitation resulting from evacuation of the cooling vessel and the consequent ebullition of water vapor.

The emulsion is placed under reduced pressure, i.e. the cooling vessel is controlledly evacuated, so that a portion of the water from the surfactant solution is evaporated and the temperature of the mixture is reduced. Evaporation is, of course, a cooling process such that the heat abstracted from the mixture is equivalent to the latent heat of vaporization of the quantity of water volatilized at the subatmospheric pressure sustained within the vessel.

With lowering temperature, crystallization of the solid component to be recovered commences and may be completed under still further pressure reduction and lowering of the temperature. Upon conclusion of the crystallization process, the solid components can be recovered from the liquid phase by conventional solid/liquid separation techniques. The crystallization may be easily controlled by regulating the suction pressure.

In many cases, the mechanical agitation of the aqueous and organic phases to form the emulsion is not necessary and it suffices that the organic phase and the surfactant phase are introduced into a cooling vessel which is subjected to reduced pressure. The ebullition of water vapor from the liquid within the vessel appears to provide sufficient agitation to mix and emulsify the system. According to a further feature of this invention, the process is carried out continuously in such manner that the molten mixture of fatty acids or glycerides and the surface-active phases are continuously introduced into a vessel maintained at a reduced pressure at which the vapor pressure of water is lowered such as to reduce the water content and lower the temperature to the level necessary for crystallization. The crystallizing product may be continuously removed from the cooling chamber and subjected to continuous recovery of the solid phase from the liquid phase.

Yet another feature of our invention resides in the provision of a multistage system for carrying our the invention, it having been found that between two and eight successive evacuation stages provide most efficient crystallization and control of the operation. The successive crystallization stages are carried out in respective crystallization vessels which may be brought to different subatmospheric pressures, preferably increasing along the path of the continuously moving fluid, the various negative pressure levels (in terms of atmospheric pressure) corresponding to various subambient temperatures. Moreover, we have found it advantageous to distribute the aqueous (surfactant) phase over the several stages rather than introduce all of the surfactant solution at the initial stage. By regulating, moreover, the liquid levels in the several vessels, we control the residence time and the cooling rate in the various stages.

The surface-active agent which is employed in accordance with the present invention, may be any of those which have been proposed in this connection heretofore (see German published application DAS 1,136,786) and may be alkylbenzenesulfonates, alcohol sulfates, alkyl sulfonates, sulfated fatty-acid monoglycerides, polyglycol ethers of fatty alcohols or alkyl phenols and soaps. The concentration of surface-active agent in the aqueous phase would be 0.1 to 5 percent by weight. It has also been observed that the addition of electrolytes and soluble salts to the aqueous phase, especially alkali metal and alkaline-earth metal chlorides, sulfates and nitrates, increase the effectiveness of the emulsifying agents the efficiency of the process.

5. DESCRIPTION OF THE DRAWING

The above and other objects, features and advantages of the present invention will become more readily apparent from the following description and specific Examples, reference being made to the accompanying drawing in which the sole FIGURE is a diagrammatic elevational view of an apparatus for carrying out the method of the present invention.

6. SPECIFIC DESCRIPTION

In the drawing I have shown a plurality of vessels, 10, 20, 30, 40 and 50, representing successive stages of a multistage treatment system as described in Example II, infra, only five of the six units being illustrated in this FIGURE. A pump 1, delivers the organic phase in the form of a melt of a fatty acid, fatty alcohol or fatty-acid ester mixture of one or more monocarboxylic acids containing 8 to 26 carbon atoms in the carbon chain, one or more mono-, di- or trihydric alcohols containing 8 to 26 carbon atoms in the carbon chain and one or more triglycerides having fatty acid components with 8 to 26 carbon atoms in the carbon chain.

The organic component is delivered in a molten state through a metering valve 2 via line 3 into the vessel 10 which is provided with a paddle-type stirrer 11 driven by a motor 11a to promote emulsification. The meter 2 controls a pump 4 which delivers the aqueous surfactant solution to the vessel 10 via line 5, branch line 6 being provided to deliver selected portions of the gaseous phase to the successive stages as described in Example II.

The vessel 10 is provided with a head 12 hermetically sealed thereon and provided with a pressure gauge 13 which may be calibrated directly in terms of temperature and use a fitting 14 connected to a suction pump. The valve 15 may be of the pressure-regulating type so that the pressure above the liquid level 17 in the vessel 10 may be controlled with ease.

From the vessel 11, the cooled liquid and/or crystal mixture (dispersion) is transferred to the second-stage vessel 20 via a line 18 and a valve 19 which controls the residence time of the liquid within the vessel 10. The vessel 20 is maintained at a somewhat lower pressure via a suction line 24, the valve 25 and the gauge 23, but is not provided with a stirrer inasmuch as ebullition of the water from the liquid 27 in the vessel suffices to maintain the emulsification action. A portion of the aqueous surfactant can be supplied to the second-stage vessel 20 via a line 6a and a valve 6b. The subsequent vessels 30, 40, and 50 may be similarly equipped to receive the liquid phase in suction and subject the liquid phase to progressively higher vacuums and to have lower temperatures. From the last stage, a duct 28 delivers the slurry of liquid and crystals to a liquid/solid separation device 60 which may be a centrifuge. The operation of the system will be apparent from Example II below.

7. SPECIFIC EXAMPLES

EXAMPLE I

Into a 300 liter crystallization flask is introduced 60 kg of fatty-acid tallow containing stearin or olein and 1200kg of a 0.5 percent aqueous solution of sodium dodecylsulfate and 1.0 percent $MgSO_4$. The aqueous phase is introduced at a temperature of 45°C. The flask is connected to a suction line and evaporation of water under suction, but without additional cooling or heating until the temperature reaches 4°C over a period of 2 hours. At about 41°C, crystallization commences. The resulting dispersion is found to contain stearic and oleic acid and an aqueous phase which are separated by centrifugation to yield oleic acid and a suspension of stearic acid and surface-active solution. The stearic acid was thereafter recovered from the solution. The oleic acid had a iodine number of 90.7 whereas the stearic acid had an iodine number of 9.7.

Using the technique of Example I, the following surface-active agents were substituted for the sodium dodecyl sulfate with similar effectiveness in like quantities:
  nonyl-phenyl ether of polyethylene glycol (Tergitol NPX);
  keryl-benzene sulfonate (Nacconal);
  sulfated stearinpolyglycerol (see page 214 SURFACE-ACTIVE AGENTS, Schwartz & Perry, Interscience Publishers, New York, 1949).

When the magnesium sulfate was replaced with magnesium chloride, magnesium nitrate, sodium chloride, potassium nitrate and sodium sulfate in like quantities, similar results were obtained. With each of the surface-active agents specified above, tests were made using 0.1 to 5 percent solutions of the surface-active agents in 0.7 percent increments with essentially equivalent results.

EXAMPLE II

Using an apparatus similar to that shown in the drawing, a continuous separation was carried out. The crystallization vessels connected in series each had a capacity of 50 liters and while it was possible to control the level of liquid in each vessel, it was found to be important to maintain the vessel at most at two thirds of its capacity. Into the first vessel was introduced 30 kg of molten tallow fatty acids and 10 kg of the aqueous surfactant mixture of Example I at a temperature of 45°C. The a subatmospheric pressure in the first vessel was adjusted to bring the temperature therein to 40°C. The mixture was then passed into the second stage in which a further quantity of 10 kg of the aqueous surfactant was suplied and the suction adjusted to maintain the temperature to 36°C. In the third through sixth stages, 10 kg each of the aqueous surfactants were supplied and the vacuums adjusted to maintain temperatures of 32°, 28°, 20°, and 5°C. The crystals were separated as in Example I to yield oleic acid, with an iodine number of 90.2 and stearic acid with an iodine number of 9.3. The processing was carried out at a rate of 30 kg of the organic mixture per hour.

We claim:
1. A method of separating and recovering at least one crystallizable component of an organic phase containing at least one fatty acid, fatty alcohol or fatty-acid ester which comprises the steps of emulsifying said organic phase in a molten state in a surfactant-containing liquid aqueous phase to form an emulsion in which said component is at least in part a disperse phase; cooling said emulsion after the interaction of said organic phase with the surfactant-containing liquid phase by subjecting same to suction to evaporate water from said emulsion, thereby crystallizing said component from said emulsion and forming a dispersion of the crystallized component in the liquid; and recovering said crystallized component in the form of crystals from said dispersion.

2. The method defined in claim 1 wherein said phases are introduced simultaneously and continuously into an evacuated vessel and said dispersion is continuously led from said vessel.

3. The method defined in claim 1 wherein the emulsion is subjected to a plurality of discrete suction stages and is brought solely thereby to successively lower temperature levels to effect crystallization therefrom.

4. The method defined in claim 3 wherein a portion of said aqueous phase is combined with said organic phase in each of said stages.

5. The method defined in claim 3 wherein said aqueous phase contains at least one surface-active agent selected from the group which consists of alkylbenzene-sulfonates, alcohol-sulfates, alkylsufonates, sulfonated fatty-acid monoglycerides, polyglycol ethers of fatty alcohols or alkyl phenols and soaps.

6. The method defined in claim 5 wherein said surface-active agent is present in said aqueous phase in a concentration of 0.1 to 5 percent.

7. The method defined in claim 6 wherein said aqueous phase further comprises at least one soluble alkali metal or alkali-earth metal chloride, nitrate or sulfate salt in solution.

8. The method defined in claim 7 wherein said salt is present in a concentration of about 1 percent.

9. The method defined in claim 8 wherein said component is stearic or oleic acid.

\* \* \* \* \*